US 6,487,402 B1

(12) United States Patent
Faus et al.

(10) Patent No.: US 6,487,402 B1
(45) Date of Patent: Nov. 26, 2002

(54) SYSTEM AND METHOD FOR PROVIDING ACCESS TO A WIRELESS COMMUNICATION SERVICE TO A GROUP OF SUBSCRIBERS WHO SHARE A SET OF MODEMS

(75) Inventors: Juan Faus, San Diego, CA (US); Janet Ackermann, Longmont, CO (US); Philip T. Mueller, Jr., Niwot, CO (US)

(73) Assignee: Qualcomm, INC, San Diego, CA (US)

( * ) Notice: Subject to any disclaimer, the term of this patent is extended or adjusted under 35 U.S.C. 154(b) by 0 days.

(21) Appl. No.: 09/237,392

(22) Filed: Jan. 26, 1999

(51) Int. Cl.$^7$ ................................................ H04M 1/66
(52) U.S. Cl. ......................... 455/411; 455/422; 455/557
(58) Field of Search ................................. 455/422, 425, 455/452, 556, 557, 560, 561, 411, 410, 518; 379/93.28, 93.31; 375/222; 380/247, 248, 271

(56) References Cited

U.S. PATENT DOCUMENTS

| 5,479,480 A | * | 12/1995 | Scott ........................... 375/222 |
| 5,513,213 A | * | 4/1996 | Patel et al. .................. 375/222 |
| 5,544,223 A | | 8/1996 | Robbins et al. |
| 5,781,856 A | | 7/1998 | Jacobs et al. |
| 5,796,808 A | * | 8/1998 | Scott et al. ............... 379/93.31 |
| 5,950,136 A | * | 9/1999 | Scott ........................... 455/452 |

FOREIGN PATENT DOCUMENTS

| EP | 0532227 | 3/1993 |
| WO | 9854918 | 12/1998 |

* cited by examiner

Primary Examiner—Nay Maung
(74) Attorney, Agent, or Firm—Philip Wadsworth; Charles Brown; George Pappas (57) ABSTRACT

A system and method for transparently providing access to a wireless communication service to a group of subscribers who share a set of modems, where each subscriber in the group is provided with a subscriber unit and each subscriber in the group is associated with static and dynamic authentication information. According to one embodiment, the system includes a transceiver system for transmitting radio wave frequency signals to and receiving radio wave frequency signals from a base station; a set of modems, wherein each modem in the set is coupled to the transceiver system; a set of subscriber units, wherein each subscriber unit is associated with authentication information; a switch coupled to each of the modems and coupled to each of the subscriber units; a control system in communication with the switch and each of the modems; and a database for storing the authentication information, wherein the database is accessible to the control system. The control system determines an available modem from the set of modems when one of the subscriber units is activated. Further, the control system directs the switch to connect the activated subscriber unit with the available modem, retrieves from the database authentication information associated with the activated subscriber unit, and provides the available modem with the retrieved authentication information. In this manner, the authentication information associated with the activated subscriber unit is provided to the modem that is handling the call. Consequently, the modem handling the call can transparently authenticate the subscriber unit in the same manner as in a conventional wireless communication service.

24 Claims, 5 Drawing Sheets

SYSTEM AND METHOD FOR PROVIDING ACCESS TO A WIRELESS COMMUNICATION SERVICE TO A GROUP OF SUBSCRIBERS WHO SHARE A SET OF MODEMS

BACKGROUND OF THE INVENTION

I. Field of the Invention

The present invention relates to subscriber authentication in a wireless communication system. More particularly, the present invention relates to subscriber authentication in a wireless communication system where a group of subscribers share a set of modems.

II. Related Art

To prevent fraud and theft of wireless communication services and to properly bill the subscribers of a wireless communication service, wireless communication service providers (such as cellular telephony providers) have created a mechanism for authenticating their subscribers. This mechanism relies on the fact that each subscriber in the system has unique authentication information (UAI) for each transceiver owned by the subscriber.

This authentication information is necessary to gain access to a wireless communication system. In this way, the authentication information is somewhat analogous to a personal identification number (PIN) used for gaining access to one's checking account through an automated teller machine.

Each subscriber's authentication information consists of static authentication data and dynamic authentication data. An electronic serial number (ESN) and a mobile identification number (MIN) are two examples of static authentication data. Shared secret data (SSD) is an example of dynamic authentication data. Static authentication data, as its name implies, remains constant over time. On the other hand, dynamic authentication data may be altered while a subscriber is actively engaged in a call, while setting up a call or while registering with a base station, etc.

In traditional wireless communication systems, each subscriber has his own subscriber unit (or transceiver), such as a cellular telephone, and each subscriber is responsible for paying for all calls made from their cell phone. Further, each subscriber unit has a modem coupled to an antenna for transmitting radio frequency (RF) signals to and receiving RF signals from a base station within the wireless communication system. Thus, in conventional wireless communication systems there is a one-to-one relationship between modems and subscribers. Because of this one-to-one relationship, a subscriber's unique authentication information is stored in the modem within the subscriber's cell phone. By storing the authentication information in the subscriber's modem, the modem can perform the authentication process in a manner that is transparent to the subscriber, and the modem can update and maintain the subscriber's dynamic authentication information as necessary. Consequently, the subscriber need not trouble himself with having to maintain his authentication information.

However, in certain wireless communications systems (such as in a Concentrated Subscriber System described later herein) there is not a one-to-one relationship between subscribers and modem systems. In such a system it is desired that the authentication process be transparent to the subscribers in the same manner that the authentication process is transparent to the subscribers in a system where there is a one-to-one correspondence between subscribers and modem systems.

What is needed, therefore, is a system and method for transparently providing access to a wireless communication service where there is not a one-to-one relationship between subscribers and modems. Further, the system and method should be compatible with existing wireless communication systems.

SUMMARY OF THE INVENTION

The present invention overcomes the above identified problem. In one aspect the invention provides a method for transparently providing access to a wireless communication service to a group of subscribers who share a set of modems, where each subscriber in the group is provided with a subscriber unit and each subscriber in the group is associated with static and dynamic authentication information.

In one embodiment the method includes the steps of: (a) detecting the activation of one of the subscriber units; (b) selecting a modem from the set of modems; (c) coupling the activated subscriber unit with the selected modem, thereby enabling traffic to flow between the activated subscriber unit and the selected modem; and (d) providing dynamic authentication information to the selected modem, wherein the dynamic authentication information provided to the selected modem is the dynamic authentication information associated with the subscriber to which the activated subscriber unit is provided.

In another embodiment the method includes the steps of: (a) detecting an incoming call addressed to one of the subscribers in the group; (b) determining a called subscriber, wherein a called subscriber is the subscriber in the group to which the incoming call is addressed; (c) selecting an available modem from the set of modems; (d) coupling the subscriber unit provided to the called subscriber with the selected modem, thereby enabling traffic to flow between the subscriber unit and the selected modem; and (e) providing dynamic authentication information to the selected modem, wherein the dynamic authentication information provided to the selected modem is the dynamic authentication information associated with the called subscriber.

Advantageously, either embodiment may further include the steps of storing in a database the dynamic authentication information associated with each subscriber in the group; storing in the selected modem the dynamic authentication information provided to the selected modem; modifying the dynamic authentication information stored in the selected modem in response to the selected modem receiving an update command message from a base station; storing the modified dynamic authentication information in the selected modem; and storing the modified dynamic authentication information in the database. In this manner, the dynamic authentication information stored in the database is updated whenever an update is received by a modem.

Additionally, the method according to either embodiment may further include the steps of storing in each of the modems the static authentication information associated with each subscriber in the group.

The invention also provides a concentrated subscriber system. The concentrated subscriber system according to one embodiment includes a transceiver system for transmitting radio wave frequency signals to and receiving radio wave frequency signals from a base station; a set of modems, wherein each modem in the set is coupled to the transceiver system; a set of subscriber units, wherein each subscriber unit is associated with unique authentication information; a switch coupled to each of the modems and coupled to each of the subscriber units; a control system in communication with the switch and each of the modems; and a database for storing authentication information, wherein the database is accessible to the control system. The control system determines an available modem from the set of modems when one of the subscriber units is activated. Further, the control system directs the switch to connect the activated subscriber unit with the available modem, retrieves from the database authentication information associated with the activated subscriber unit, and provides the available modem with the retrieved authentication information. In this manner, the authentication information associated with the activated subscriber unit is provided to the modem that is handling the call. Consequently, the modem handling the call can transparently authenticate the subscriber unit in the same manner as in a conventional wireless communication service.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

A system and method for performing subscriber authentication in a wireless communication system is provided. In the following description various procedures, arrangements, and systems are described in detail. This includes the description of a cellular telephone system operating in accordance with a particular code division multiple access (CDMA) cellular telephone specification and protocol. It will be apparent to one skilled in the art that the present invention may be practiced within a variety of cellular or wireless communication systems, although the described embodiment is preferred. Additionally, the use of an electronic serial number (ESN) to identify and page a subscriber unit is also described. It will also be apparent that other unique identification codes may be substituted for the ESN including a mobile identification number (MIN) or more generally a subscriber unit identification number (SUIN). In other instances various well known structures and systems are provided in block form. This is done in order to avoid unnecessarily obscuring the disclosure of the present invention.

Figure 1:
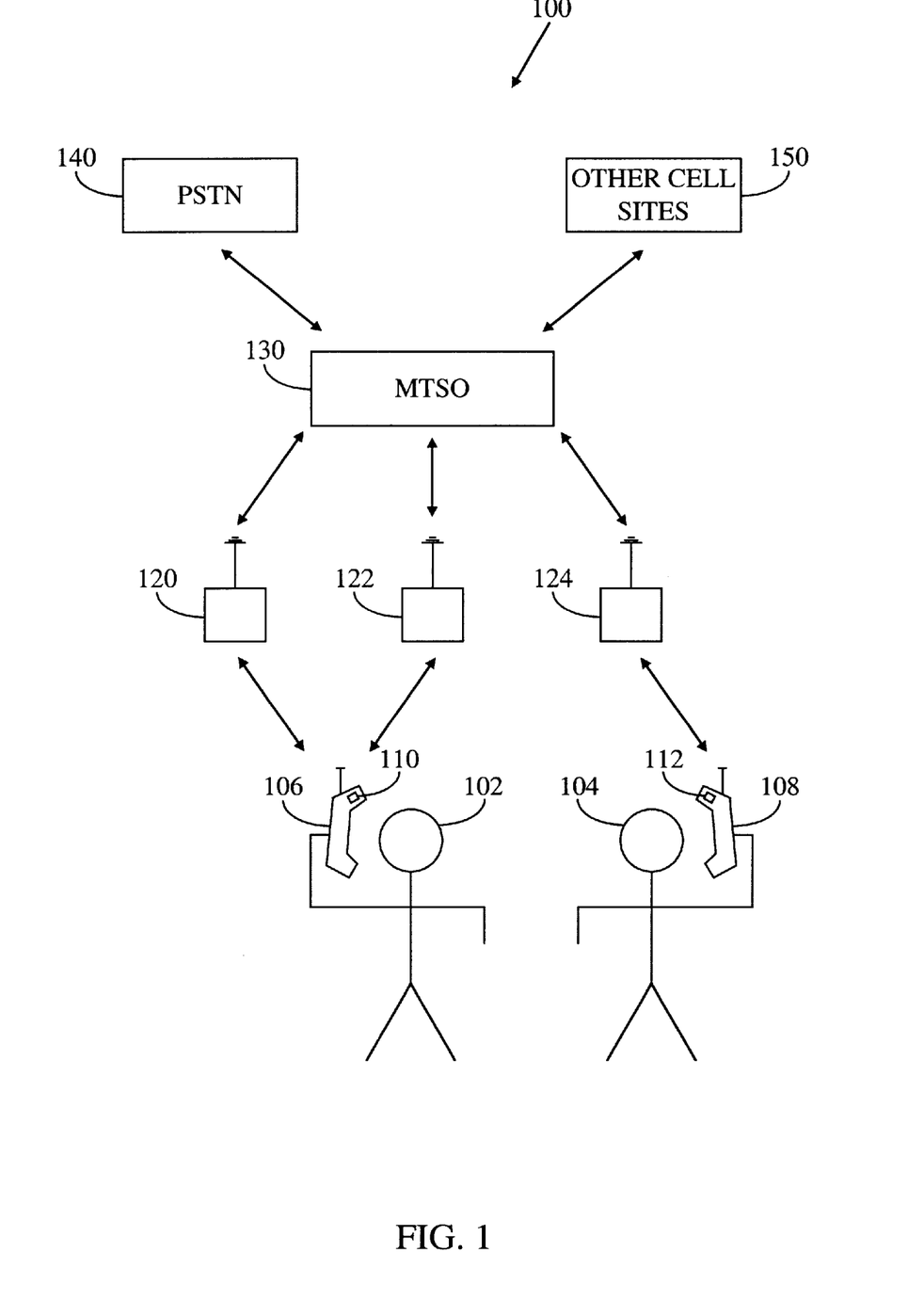
FIG. 1 is an illustration of a cellular telephone system configured in a manner consistent with the use of CDMA radio wave modulation techniques.

FIG. 1 is an illustration of a cellular telephone system 100 configured in a manner consistent with the use of CDMA radio wave modulation techniques. One implementation for such a CDMA cellular telephone system is described in U.S. Pat. No. 4,901,307 ('307) entitled "Spread Spectrum Multiple Access Communication System Using a Satellite or Terrestrial Repeater" and in U.S. Pat. No. 5,103,459 ('459) entitled "System and Method for Generating Signal Waveforms in a CDMA Cellular Telephone System," both assigned to the assignee of the present invention, the disclosures of which are incorporated herein by reference. Additionally, an implementation for a CDMA cellular telephone system is described in specification IS-95 from the Telecommunication Industry Association (2001 Pennsylvania Avenue, Suite 800, Washington, D.C. 20006) entitled "Mobile Station-Base Station Compatibility Standard for Dual Mode Wideband Spread Spectrum Cellular System" (IS-95), which is also incorporated herein by reference.

FIG. 1 illustrates two subscribers 102 and 104 using conventional cellular telephone system 100. Conventionally, subscriber 102 is in possession of cellular telephone (hereafter cell phone) 106 and subscriber 104 is in possession of cell phone 108. In cellular telephone system 100, subscriber 102 is billed for all calls made from cell phone 106. Likewise, subscriber 104 is billed for all calls made from cell phone 108.

Cell phone 106 includes a modem 110. Likewise, cell phone 108 includes a modem 112. Modems 110 and 112 are responsible for, among other things, receiving radio frequency (RF) signals from and transmitting RF signals to base stations 120, 122, and 124. Preferably, modems 110 and 112 transmit and receive RF signals that are modulated in accordance with the CDMA spread spectrum techniques described in above referenced patents '459 and '307 and specification IS-95.

Base stations 120, 122, and 124 communicate with mobile telephone switching office (MTSO) 130 in a variety of ways, including ground based wires or microwave links. MTSO 130 routes traffic it receives from base stations 120, 122, and 124 to public switched telephone network (PSTN) 140 or to other cell sites 150. In general, cell phones 106 and 108 do not communicate directly with one another.

To prevent fraud and theft and to ensure proper billing, a subscriber in system 100, such as subscriber 102, must be authenticated prior to the subscriber being giving access to cellular phone system 100. Consequently, each subscriber 102 and 104 in system 100 is given unique authentication information (UAI) that is used for authentication purposes. That is, without having valid unique authentication information, a subscriber, such as subscriber 102, will be denied access to cell phone system 100.

Because subscriber 102 has his own cell phone 106, and because cell phone 106 has a modem 110, subscriber 102's UAI is stored within modem 110. Consequently, the authentication process can be handled by modem 110 in a manner that is transparent to subscriber 102. The same is true for subscriber 104. This provides a benefit to subscribers 102 and 104 in that neither of subscribers 102 and 104 need concern themselves with having to participate in the authentication process. Of course, because subscriber 102's UAI is stored within cell phone 106, subscriber 102 must take care not to lose cell phone 106. Otherwise, subscriber 102 may end up paying for phone calls from cell phone 106 that subscriber 102 did not make or authorize. The same goes for subscriber 104.

A subscriber's UAI consists of static authentication data and dynamic authentication data. In one embodiment, static authentication data includes an electronic serial number (ESN) and an authentication key (A-Key), and dynamic authentication data includes shared secret data (SSD) and a count value. The count value indicates the number of times the dynamic authentication data has been updates. Preferably, each subscriber in system 100 is given a unique ESN. Thus, an ESN uniquely identifies a subscriber and a specific cell phone. Any call charges associated with an ESN are billed to the subscriber identified by that ESN.

Static authentication data, as its name implies, remains constant over time. On the other hand, dynamic authentication data may be altered while a subscriber is actively engaged in a call, initiating or terminating a call, or registering.

Figure 2:
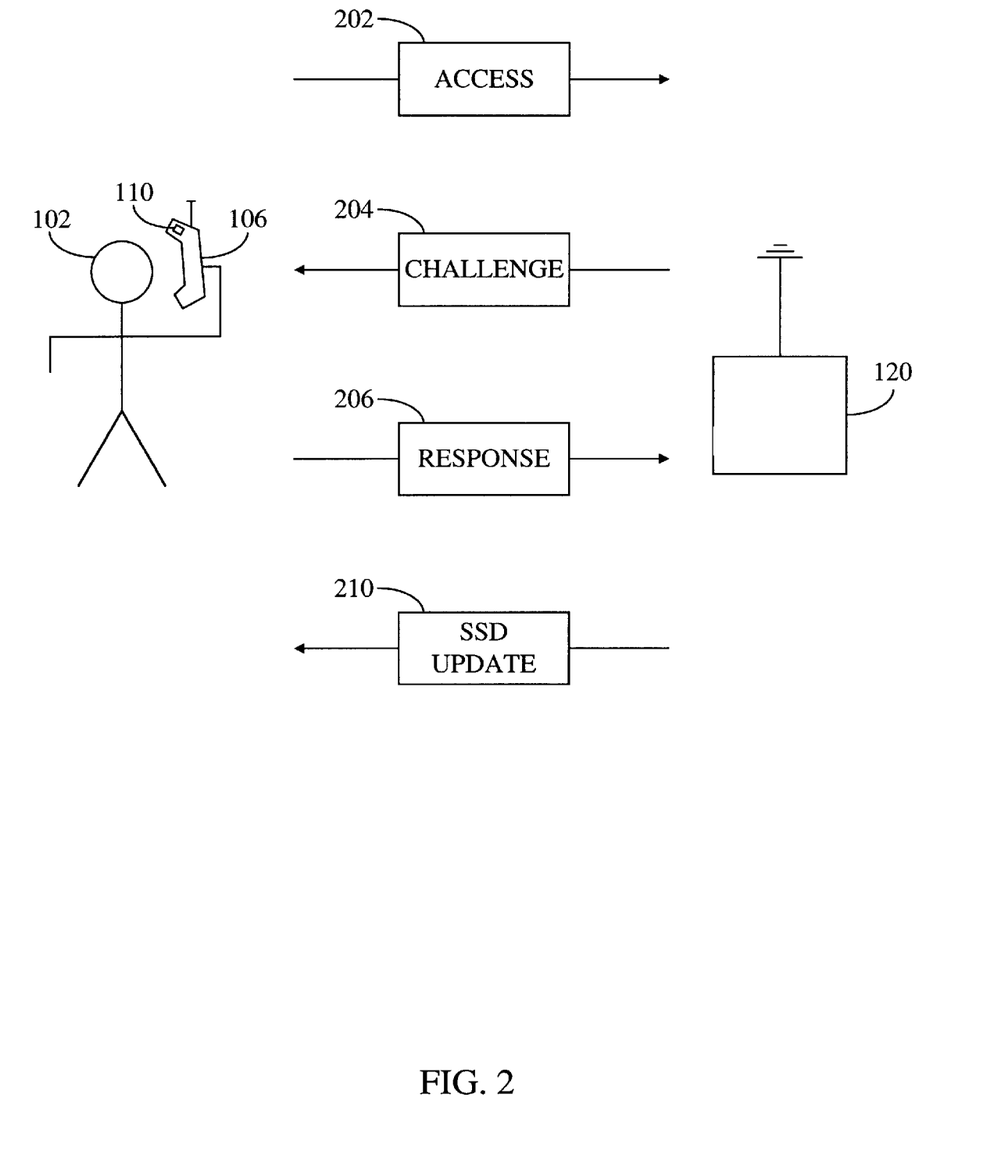
FIG. 2 illustrates an exemplary authentication process.

FIG. 2 illustrates an exemplary authentication process 200 involving subscriber 102. When subscriber 102 desires to place a call, modem 110 within cell phone 106 transmits an access message 202 to a base station, such as base station 120. Preferably, access message 202 includes the subscriber's ESN so that base station 120 can determine that the call is being originated by an authorized cell phone. Base station 120 responds to access message 202 by transmitting a challenge message 204 to modem 110. Modem 110 must then respond to the challenge message 204 by transmitting a response message 206 to base station 120. If the UAI within the modem 110 is valid, then modem 110 is able to respond correctly to challenge message 204. In that case, base station 120 allocates a traffic channel over which the call can be placed and directs cell phone 106 to update its SSD and its count value. However, if modem 110 does not have valid UAI, modem 110 will incorrectly respond to challenge message 204. As a result, base station 120 denies subscriber 102 access to cellular system 100. Consequently, as long as modem 110 has subscriber 102's current UAI, subscriber 102 can place calls using cellular system 100.

As stated above, subscriber 102's UAI includes static and dynamic authentication information. The static authentication information remains constant over time. However, during the course of a phone call, base station 120 may send one or more shared secret data (SSD) update messages 210 to modem 110. An SSD update message is a command message, the actual SSD is not sent over the air. In response to receiving an SSD update message, modem 110 modifies the subscriber 102's dynamic authentication information. In this manner, subscriber 102's UAI changes over time.

As described above, there is a one-to-one relationship between subscribers and modems in conventional cellular system 100. For example, modem 110 is associated with subscriber 102 and modem 112 is associated with subscriber 104. As illustrated above, cell phone system 100 takes advantage of this one-to-one relationship by storing a subscriber's UAI in the modem associated with the subscriber. In addition, the modem maintains the subscriber's UAI. That is, the modem updates/modifies the subscriber's dynamic authentication information in accordance with SSD update message 210 received from a base station 120, 122, or 124. In this manner, subscribers within cellular system 100 need not be concerned with remembering and maintaining their UAI. Consequently, the subscriber authentication process 200 is transparent to the subscriber.

Figure 3:
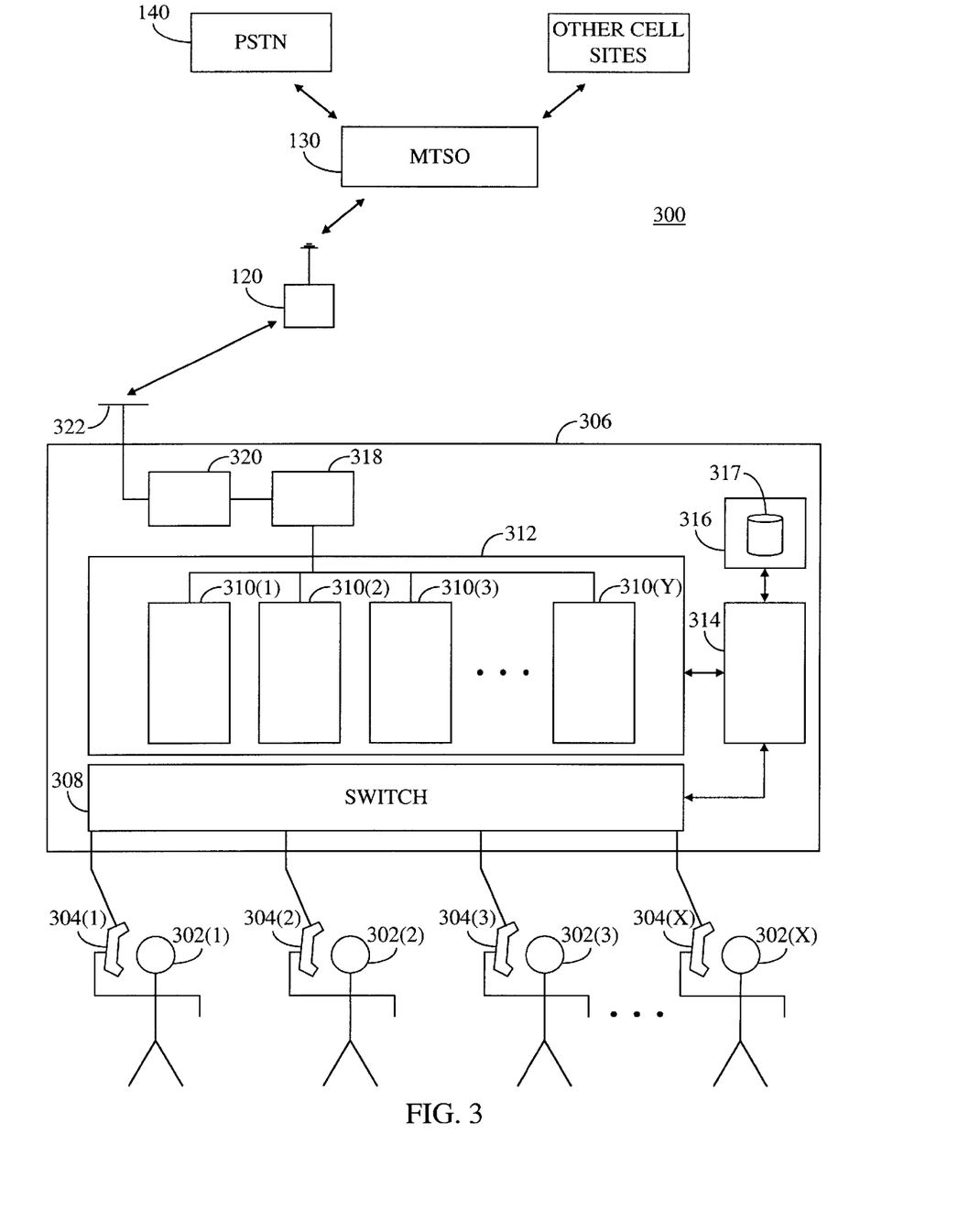
FIG. 3 illustrates one embodiment of a cell phone system having a many-to-many relationship between subscribers and modems.

FIG. 3 illustrates one embodiment of a cell phone system 300 having a many-to-many relationship between subscribers and modems. More particularly, FIG. 3 illustrates a concentrated subscriber system (CSS) 306 through which subscribers 302(1) through 302(X) share modems 310(1) through 310(Y), where X and Y are both positive integer numbers, and preferably, X is greater than Y. The present invention will be described with reference to FIG. 3. However, the present invention is useful in other embodiments of cell phone systems having a many-to-many relationship between subscribers and modems.

CSS 306 enables subscribers 302 to share modems 310. The system operates on the premise that at any given point in time the probability that more than Y of the X subscribers 302 are engaged in a call is extremely small.

CSS 306 includes a switch 308, a control system 314, one or more modems 310, a modem interface system 318, a memory subsystem 316, an antenna interface system 320, and an antenna 322. A transceiver sub-system is formed within the CSS by antenna 322, antenna interface system 320, and modem interface system 318. Many transceiver sub-systems are known in the art and one implementation of a transceiver sub-system is described in further detail in co-pending U.S. Pat. No. 5,737,687, entitled "Self-Attenuating RF Transceiver System Using Antenna and Modem Interface and Cable Link," assigned to the assignee of the present invention and incorporated herein by reference.

Antenna interface system 320 receives radio frequency signals from a base station, such as base station 120,through antenna 322 and transmits these signals through modem interface 318 to modem bank 312, which is comprised of modems 310(1) through 310(Y). Preferably, to reduce the cost of developing CSS 306, modems 310 are similar in structure and functionality to modems 110 and 112 used in cell phones 106 and 108, respectively. Switch 308 selectively couples subscriber units 304 to modems 310.

Control system 314 receives information from and provides information to modems 310 and controls the operation of switch 308 using information stored in memory subsystem 316. The configuration and operation of CSS 306 is described in further detail in U.S. Pat. No. 5,781,856, entitled "Concentrated Subscriber System for Wireless Local Loop," filed on Jan. 10, 1994, assigned to the assignee of the present invention and the disclosure of which is incorporated herein by reference.

As illustrated in FIG. 3, each subscriber unit 304(1)–(X) coupled to switch 308 is associated with a corresponding subscriber 302(1)–(X). For example, subscriber unit 304(1) is associated with subscriber 302(1) and subscriber unit 304(2) is associated with subscriber 302(2). Preferably, subscriber units 304 generally lack the circuitry necessary to transmit and receive radio waves and to modulate and demodulate data from digital to analog format. That is, subscriber units 304 lack a modem. Subscriber units 304 essentially consist of a speaker and microphone. Preferably, subscriber units 304 are standard telephone sets used to provide conventional wire based, pulse code modulated, telephone service and have twisted pair or PBX style connections. While subscriber units 304 are shown as coupled directly to switch 308, alternative methods for exchanging information between subscriber units 304 and switch 308 are contemplated, including a simplified form of radio wave based communication.

When a subscriber 302, such as subscriber 302(1), desires to place a telephone call, subscriber 302(1) activates its associated subscriber unit 304(1). Activation of subscriber unit 304(1) usually corresponds to removing a handset (not shown) from a cradle (not shown) as with a standard wire based telephone. Control system 314 detects when subscriber unit 304(1) is activated. Upon detecting the activation of subscriber unit 304(1), control system 314 determines if a modem 310 is available to process a phone call. Each modem 310 can only process one phone call at a time. Thus, a modem is only available when it is not already processing a call. If a modem 310 is not available, control system 314 provides a rapid busy signal to subscriber unit 304(1). Otherwise, control system 314 provides a dial tone like signal to the activated subscriber unit 304(1). The available modem is then designated to process the telephone call. That is, control system 314 connects the available modem with subscriber unit 304(1) through switch 308.

When someone places a call to one of the subscriber units 304(1)–(X), the call is routed to base station 120. Upon detecting a call for one of the subscriber units 304(1)–(X), base station 120 transmits a page message to CSS 306 over a paging channel. The page message includes a subscriber unit identifier. Preferably, the subscriber identifier includes an electronic security number i(ESN) that identifies the subscriber unit 304 for which the call is destined. Alternatively, instead of the ESN, the MIN could be used.

To detect incoming calls, control system 314 selects one or more of modems 310(1)–(Y) to listen for page messages on the paging channel. These modems are referred to as "paging modems." When one of the paging modems receives a page message, the paging modem provides the ESN contained in the page message to control system 314. In this manner, control system 314 detects incoming calls and is informed of the subscriber unit 304 to which the call is addressed.

Upon detecting an incoming call for one of the subscriber units 304, for example, subscriber unit 304(3), control system 314 determines if subscriber unit 304(3) is on or off hook. Control system 314 queries switch 308 to determine whether subscriber unit 304(3) is off hook. If the subscriber unit 304(3) is off hook, then subscriber unit 304(3) is "busy" and can not take the call. In this case, control system 314 transmits a busy signal (or a call rejection message) to base station 120. If the subscriber unit 304 is not off hook, control system 314 designates an available modem, such as modem 310(1), to process the call and directs switch 308 to couple subscriber unit 304(3) with designated modem 310(1).

Like subscribers 102 and 104 in cell phone system 100, subscribers 302(1)–(X) each are associated with unique authentication information (UAI), including static authentication information and dynamic authentication information (DAI). The UAI associated with each subscriber 302(1)–(X) is stored in a database 317 in memory sub-system 316. Furthermore, before one of modems 310(1)–(Y) can process a phone call on behalf of one of subscribers 302(1)–(X), subscriber 302 must first be authenticated in accordance with the authentication process illustrated in FIG. 2. That is, the modem 310 that process a phone call on behalf of one of subscribers 302 must correctly respond to challenge message 204 sent from base station 120. In order for modem 310 to successfully respond to challenge message 204, and thereby authenticate subscriber 302, modem 310 must have access to subscriber's 302 UAI.

In a first embodiment, each modem 310 is provided with each subscribers' 302 static and dynamic authentication information when CSS 306 is initialized. In a second embodiment, each modem 310 is provided only with each subscribers' 302 static authentication information when CSS 306 is initialized.

In the second embodiment, control system 314 provides a subscriber's 302 dynamic authentication information to a modem 310 on an as needed basis. That is, when a particular modem is designated to process an out-going or incoming call, control system 314 provides the appropriate dynamic authentication information to the particular modem 310. For example, if control system 314 detects that subscriber unit 304(3) is activated and that a modem is available to process an outgoing call, then control system 314 retrieves the DAI corresponding to subscriber 302(3) from database 317 and then provides the retrieved DAI to the available modem. As another example, if control system 314 detects an incoming call directed to subscriber unit 304(5), then control system 314 retrieves the DAI corresponding to subscriber 302(5) from database 317 and then provides the retrieved DAI to an available modem to process the call.

In a third embodiment, modems 310 are not provided with each subscriber's static authentication information when CSS 306 is initialized. Instead, control system 314 provides both the static and dynamic authentication data to modems 310 as necessary. It is necessary to provide the authentication information to a modem 310 when a modem 310 is designated to process an out-going or incoming call on behalf of a particular subscriber 302 or when modem 310 has been selected to monitor the paging cannel.

During the course of a call, base station 120 may send one or more SSD update messages 210 to the modem handling the call. In response to receiving the SSD update message 210, the modem handling the call modifies its local copy of the subscriber's DAI. In one embodiment, after modifying its local copy of the subscriber's DAI, the modem immediately notifies control system 314 of the modification so that control system 314 can update the master copy of the subscriber's DAI, which is stored in database 317. In another embodiment, the modem informs control system 314 of the modification(s) at the end of the call. In either case, control system 314 is provided with the subscriber's new dynamic authentication information.

In one embodiment, upon receiving a subscriber's new dynamic authentication information, control system 314 stores it in database 317, and, as described above, provides this information to modems 310 on an as needed basis. In an alternative embodiment, upon receiving a subscriber's new dynamic authentication information, control system 314 provides it to each modem 310.

Figure 4:
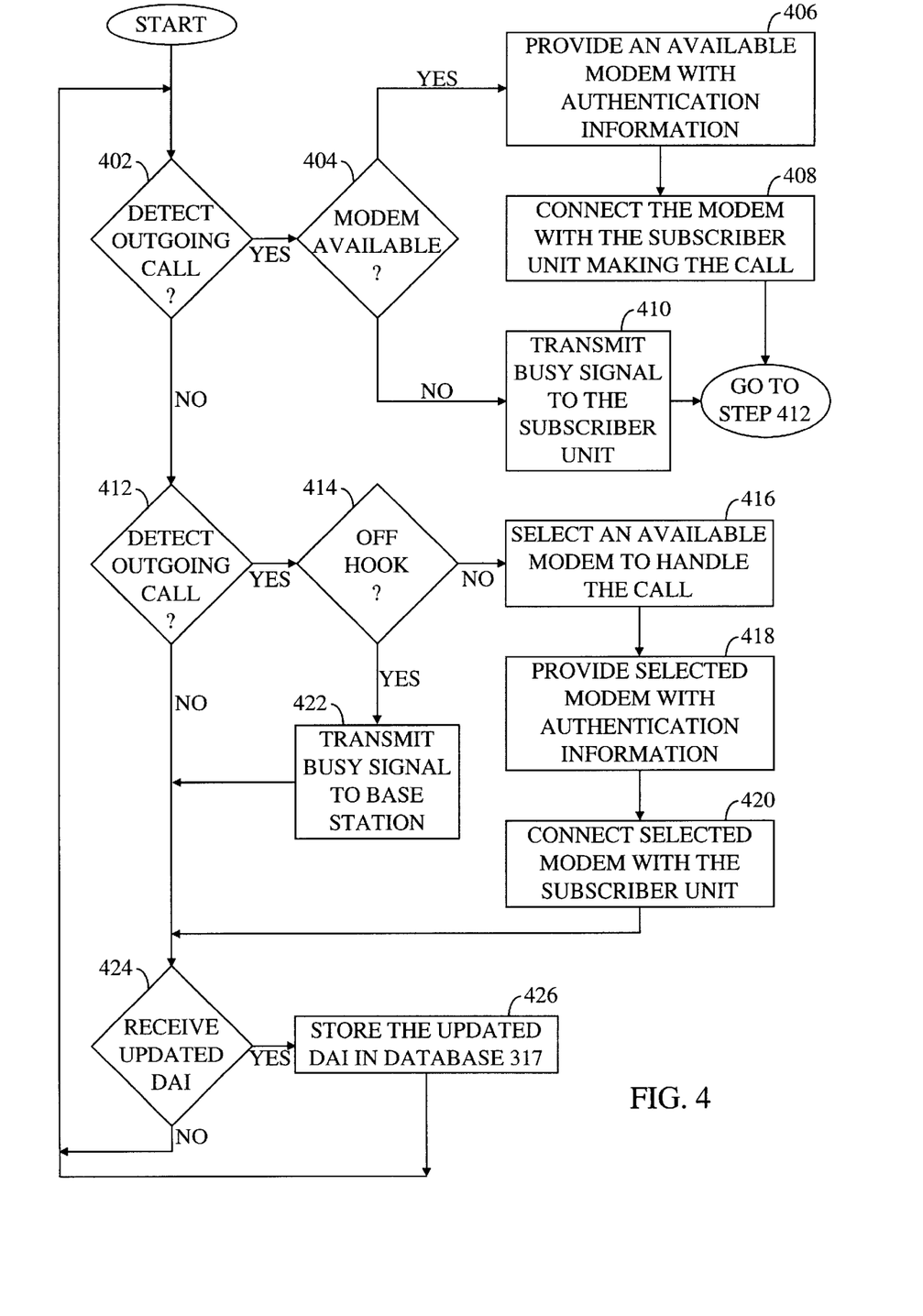
FIG. 4 illustrates the operational flow, according to one embodiment, of a control system of a concentrated subscriber system.

FIG. 4 illustrates the operational flow of control system 314 according to one embodiment. The process begins in step 402 where control system 314 determines whether one of subscribers 302 desires to place an outgoing call. Control system 314 determines this by determining whether one of subscriber units 304 has been activated. If control system 314 detects the activation of a subscriber unit 304, control passes to step 404, otherwise control passes to step 412.

In step 404, control system 314 determines whether one of the modems 310(1)–(Y) is available to process a call. If a modem 310 is available, control passes to step 406, otherwise control system 314 transmits a busy signal to the activated subscriber unit (step 410). The process then proceeds to step 412.

In step 406, control system 314 selects one of the available modems to process the call and provides the selected modem with authentication information from database 317. As stated above, control system 314 stores authentication information for each subscriber 302(1)–(X) in database 317. In one embodiment, control system 314 provides the selected modem with only dynamic authentication data. In this embodiment, each modem is provided with each subscribers' static authentication information at the time of CSS 306 initialization. In another embodiment, control system 314 provides the modem with both static and dynamic authentication information.

Control system 314 determines which subscriber's authentication information to provide to the selected modem based on the subscriber unit 304 that is being used to place the call. For example, if subscriber unit 304(3) goes off hook, then subscriber 302(3)'s authentication information is provided to the selected modem. The selected modem 310 is then coupled to subscriber unit 304(3) through switch 308 (step 408). Upon being coupled to subscriber unit 304(3), the selected modem 310 can process the call for subscriber unit 304(3). That is, the selected modem receives data from subscriber unit 304(3) and transmits it to base station 120, and receives traffic from base station 120 and transmits it to subscriber unit 304(3). After step 408, control passes to step 412.

In step 412, control system 314 determines whether there is an incoming call for one of the subscriber units 304(1)–(X). As stated above, if there is an incoming call for one of the subscriber units 304(1)–(X), the paging modems receive a page message from base station 120. The page message contains a unique ESN (or MIN) that identifies which subscriber unit 304(1)–(X) is being called. When a paging modem receives a page message, the paging modem provides control system 314 with the ESN in the page message. In this manner, control system 314 determines when there is an incoming call for one of the subscriber units 304(1)–(X). If there are no incoming calls, control passes to step 424, otherwise control passes to step 414.

Assuming an incoming call is directed to subscriber unit 304(2) (that is, the ESN in a page message identifies subscriber unit 304(2)), control system 314 determines whether subscriber unit 304(2) is already in use (i.e., is off hook) (step 414). If subscriber unit 304(2) is in use, then control system 314 transmits a busy signal or page rejection message to base station 120 (step 422) and control then passes to step 424. If subscriber unit 304(2) is not in use, control passes to step 416.

In step 416, control system 314 selects an available modem to process the call, and in step 418 provides the selected modem with authentication information from database 317. As stated above, control system 314 stores authentication information for each subscriber 302(1)–(X) in database 317. In one embodiment, control system 314 provides the selected modem with dynamic authentication data only. In this embodiment, each modem is provided with each subscriber's static authentication information at the time of CSS 306 initialization. In another embodiment, control system 314 provides the modem with both static and dynamic authentication information.

Control system 314 determines which subscriber's authentication information to provide to the selected modem based on the subscriber unit 304 that is identified in the page message received from base station 120. In this example, the page message contains the ESN associated with subscriber unit 304(2). Thus, subscriber 302(2)'s authentication information is provided to the selected modem, which is then coupled to subscriber unit 304(2) through switch 308 (step 420). Upon being coupled to subscriber unit 304(2), the selected modem can process the call for the subscriber. That is, the selected modem receives data from subscriber unit 304(2) and transmits it to base station 120, and receives traffic from base station 120 and transmits it to subscriber unit 304(2). After step 420, control passes to step 424.

In step 424, control system 314 determines whether a modem 310 has sent it a subscriber's updated dynamic authentication information. As stated above, a modem 310 processing a call for a particular subscriber 302 may at times receive an SSD update message 210 from base station 120. In response to receiving such a message from base station 120, the modem 310 updates the subscriber's DAI locally and then, at some point, provides the updated DAI to control system 314.

If control system 314 has not received an updated DAI from one of the modems 310, then control returns to step 402. Otherwise control passes to step 426. In step 426, control system 314 updates database 317 with the received updated DAI. After step 426, control passes back to step 402 where the process repeats it self.

Figure 5:
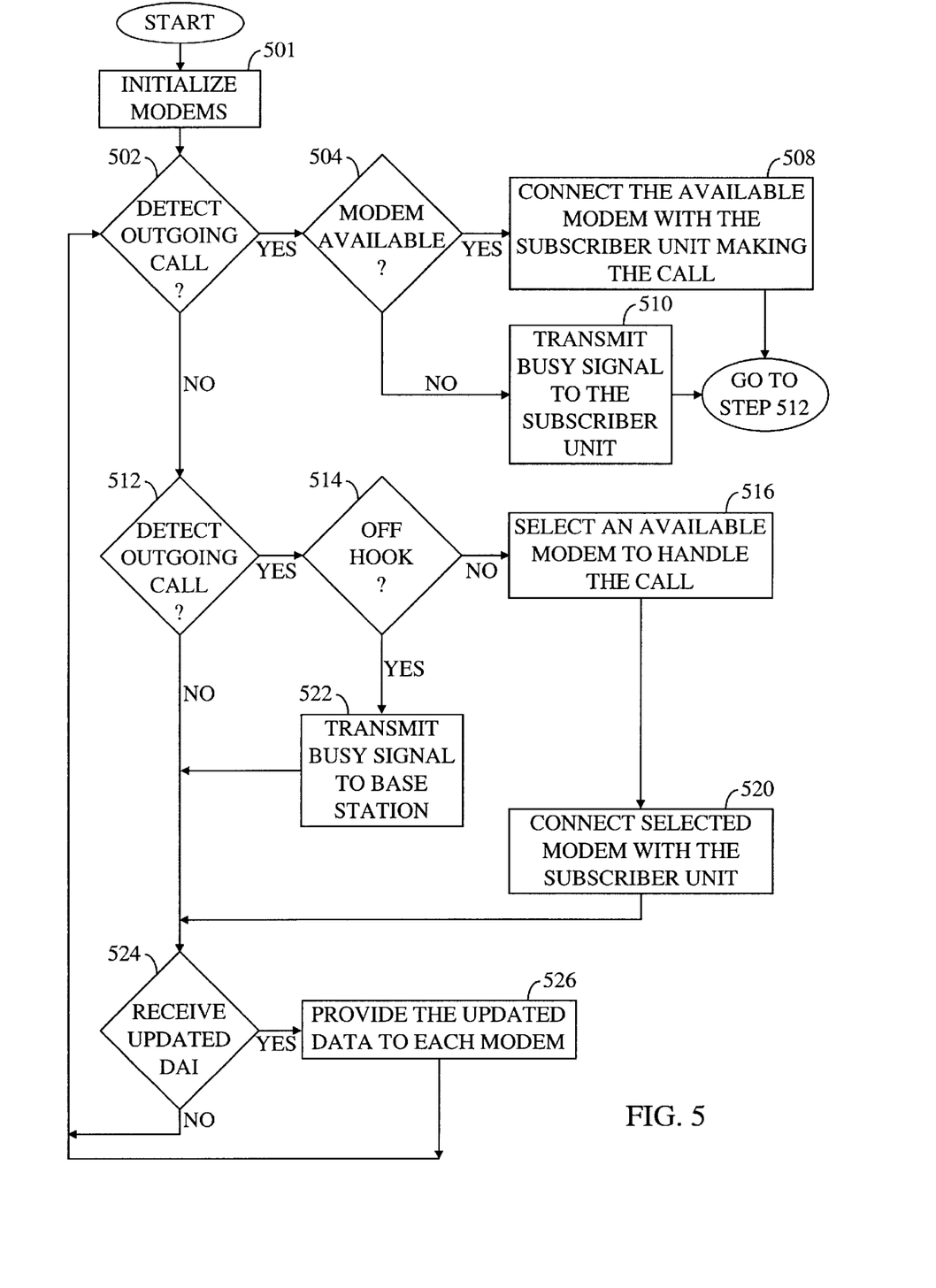
FIG. 5 illustrates the operation flow, according to an alternative embodiment, of a control system of a concentrated subscriber system.

FIG. 5 illustrates the operational flow of control system 314 according to a second embodiment. The process begins in step 501 where control system 314 initializes modems 310. That is, control system 314 provides each modem 310 with each subscribers' 302 static and dynamic authentication information. After step 501, control passes to step 502. In step 502, control system 314 determines whether one of subscriber units 304 has been activated. If control system 314 detects the activation of a subscriber unit 304, control passes to step 504, otherwise control passes to step 512.

In step 504, control system 314 determines whether one of the modems 310(1)–(Y) is available to process a call. If a modem 310 is available, control passes to step 508, otherwise control system 314 transmits a busy signal to the activated subscriber unit (step 510) and then the process then proceeds to step 512.

In step 508, control system 314 selects one of the available modems to process the call and then couples the activated subscriber unit to the selected modem through switch 308. Upon being coupled to the activated subscriber unit, the selected modem can receive data from the activated subscriber unit and transmit the data to base station 120. After step 508, control passes to step 512.

In step 512, control system 314 determines whether there is an incoming call for one of the subscriber units 304(1)–(X). If there are no incoming calls, control passes to step 524, otherwise control passes to step 514.

Assuming an incoming call is directed to subscriber unit 304(2) (that is, the ESN in a page message identifies subscriber unit 304(2)), control system 314 determines whether subscriber unit 304(2) is already in use (i.e., is off hook) (step 514). If subscriber unit 304(2) is in use, then control system 314 transmits a busy signal or page rejection message to base station 120 (step 522), and control then passes to step 524. If subscriber unit 304(2) is not in use, control passes to step 516.

In step 516, control system 314 selects an available modem to process the call. Control system 314 then couples the selected modem to subscriber unit 304(2) through switch 308 (step 520). Upon being coupled to subscriber unit 304(2), the selected modem can process the call for the subscriber. That is, the selected modem receives data from subscriber unit 304(2) and transmits it to base station 120, and receives traffic from base station 120 and transmits it to subscriber unit 304(2). After step 520, control passes to step 524.

In step 524, control system 314 determines whether a modem 310 has sent it a subscriber's updated dynamic authentication information. As stated above, a modem 310 processing a call may at times receive an SSD update message 210 from base station 120. In response to receiving such a message from base station 120, the modem 310 updates the subscriber's DAI locally and then, at some point, provides the updated DAI to control system 314.

If control system 314 has not received an updated DAI from one of the modems 310, then control returns to step 502. Otherwise control passes to step 526. In step 526, control system 314 provides the updated DAI to the other modems. Control then passes back to step 502.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. In a concentrated subscriber system, a method for providing a group of subscribers with access to a wireless communication service, wherein each subscriber in the group of subscribers is provided with a subscriber unit, each subscriber in the group of subscribers is associated with static and dynamic authentication information, and the group of subscribers share a plurality of modems, comprising the steps of:

(a) detecting the activation of one of the subscriber units;

(b) selecting a modem from the plurality of modems;

(c) coupling said activated subscriber unit with said selected modem, thereby enabling traffic to flow between said activated subscriber unit and the selected modem; and (d) providing dynamic authentication information to said selected modem, wherein said dynamic authentication information provided to said selected modem is the dynamic authentication information associated with the subscriber to which said activated subscriber unit is provided.

2. The method of claim 1, further comprising the step of storing in a database the dynamic authentication information associated with each subscriber in the group.

3. The method of claim 2, further comprising the step of retrieving dynamic authentication information from said database, wherein the dynamic authentication information retrieved from said database is the dynamic authentication information associated with the subscriber to which said activated subscriber unit is provided.

4. The method of claim 3, wherein the dynamic authentication information provided to said selected modem is said dynamic authentication information retrieved from said database.

5. The method of claim 4, further comprising the step of storing in said selected modem said dynamic authentication information provided to said selected modem.

6. The method of claim 5, further comprising the steps of:
    modifying said dynamic authentication information stored in said selected modem in response to said selected modem receiving an update message from a base station; and
    storing said modified dynamic authentication information in said selected modem.

7. The method of claim 6, further comprising the step of storing said modified dynamic authentication information in said database.

8. The method of claim 1, further comprising the step of storing in each of the plurality of modems the static authentication information associated with each subscriber in the group.

9. The method of claim 1, further comprising the step of determining whether one of the plurality of modems is available to process a call.

10. The method of claim 9, further comprising the step of transmitting a busy signal to said activated subscriber unit if none of the plurality of modems are available to process a call.

11. In a concentrated subscriber system, a method for providing a group of subscribers with access to a wireless communication service, wherein each subscriber in the group of subscribers is provided with a subscriber unit, each subscriber in the group of subscribers is provided with static and dynamic authentication information, and the group of subscribers share a plurality of modems, comprising the steps of:

(a) detecting an incoming call addressed to one of the subscribers in the group;

(b) determining a called subscriber, wherein said called subscriber is the subscriber in the group to which said incoming call is addressed;

(c) selecting an available modem from the plurality of modems;

(d) coupling the subscriber unit provided to said called subscriber with siad selected modem, thereby enabling traffic to flow between the subscriber unit provided to said called subscriber and the selected modem; and (e) providing dynamic authentication information to said selected modem, wherein said dynamic authentication information provided to said selected modem is the dynamic authentication information associated with said called subscriber.

12. The method of claim 11, further comprising the step of storing in a database the dynamic authentication information associated with each subscriber in the group.

13. The method of claim 12, further comprising the step of retrieving dynamic authentication information from said database, wherein the dynamic authentication information retrieved from said database is the dynamic authentication information associated with said called subscriber.

14. The method of claim 13, wherein the dynamic authentication information provided to said selected modem is said dynamic authentication information retrieved from said database.

15. The method of claim 14, further comprising the step of storing in said selected modem said dynamic authentication information provided to said selected modem.

16. The method of claim 15, further comprising the steps of:
    modifying said dynamic authentication information stored in said selected modem in response to said selected modem receiving an update message from a base station; and
    storing said modified dynamic authentication information in said selected modem.

17. The method of claim 16, further comprising the step of storing said modified dynamic authentication information in said database.

18. The method of claim 11, further comprising the step of storing in each of the plurality of modems the static authentication information associated with each subscriber in the group.

19. The method of claim 11, further comprising the steps of:
    determining if the subscriber unit provided to said called subscriber is in use; and
    transmitting a busy signal to a base station if the subscriber unit provided to said called subscriber is in use.

20. A concentrated subscriber system, comprising:

a transceiver system for transmitting radio wave frequency signals to and receiving radio wave frequency signals from a base station;

a plurality of modems, each of said plurality of modems being coupled to said transceiver system;

a plurality of subscriber units, each of said plurality of subscriber units having associated unique static and dynamic authentication information;

a switch coupled to each of said plurality of modems and coupled to each of said plurality of subscriber units;

a control system in communication with said switch and each of said plurality of modems; and a database for storing at least the dynamic authentication information, said database being accessible to said control system, wherein said control system determines an available modem from said plurality of modems when one of said plurality of subscriber units is activated, directs said switch to connect said one of said plurality of subscriber units with said available modem, retrieves from said database the stored dynamic authentication information associated with said one of said plurality of subscriber units, and provides said available modem with said retrieved stored dynamic authentication information.

21. The concentrated subscriber system of claim 20, wherein when the concentrated subscriber system is initialized, said control system provides each of said plurality of modems with the static authentication information corresponding to each of said plurality of subscriber units.

22. The concentrated subscriber system of claim 20, wherein said available modem modifies the dynamic authentication information provided to it from said control system, in response to receiving a message from said base station, said available modem communicates said modified dynamic authentication information to said control system.

23. The concentrated subscriber system of claim 22, wherein said control system stores said modified dynamic authentication information in said database.

24. A method for providing a group of subscribers with access to a wireless communication service, wherein each subscriber in the group of subscribers is provided with a subscriber unit, each subscriber in the group of subscribers is provided with static and dynamic authentication information, and the group of subscribers share a plurality of modems, comprising the steps of:

(a) providing each of the plurality of modems with each subscriber's static and dynamic authentication information;

(b) detecting an incoming call addressed to one of the subscribers in the group;

(c) determining a called subscriber, wherein said called subscriber is the subscriber in the group to which said incoming call is addressed;

(d) selecting an available modem from the plurality of modems;

(e) coupling the subscriber unit provided to said called subscriber with said selected modem, thereby enabling traffic to flow between the subscriber unit provided to said called subscriber and the selected modem;

(f) receiving updated dynamic authentication information from said selected modem; and (g) providing said updated dynamic authentication information to each of the plurality of modems except said selected modem.

\* \* \* \* \*